Aug. 19, 1969   H. DUPUIS   3,461,751
BORING BAR

Filed June 5, 1967   2 Sheets-Sheet 1

INVENTOR
HUBERT DUPUIS
BY Whittemore, Hulbert & Belknap
ATTORNEYS

Aug. 19, 1969  H. DUPUIS  3,461,751
BORING BAR

Filed June 5, 1967  2 Sheets-Sheet 2

INVENTOR
HUBERT DUPUIS
BY
ATTORNEYS

United States Patent Office 3,461,751
Patented Aug. 19, 1969

3,461,751
BORING BAR
Hubert Dupuis, Warren, Mich., assignor, by mesne assignments, to Allegheny Ludlum Steel Corporation, Pittsburgh, Pa., a corporation of Pennsylvania
Continuation-in-part of application Ser. No. 620,815, Mar. 6, 1967. This application June 5, 1967, Ser. No. 643,620
Int. Cl. B23b 29/02, 47/00
U.S. Cl. 77—58                9 Claims

ABSTRACT OF THE DISCLOSURE

A boring bar having a head provided with a plurality of recesses opening at the end and side thereof, a size determining abutment member positioned coaxially to said boring bar and having a piloted conical head extending into all of said recesses for engagement with the radially inner edges of indexable inserts received therein, said member in one embodiment of the invention being axially adjustable for hole size adjustment.

Cross-reference to related application

This is a continuation-in-part of application Ser. No. 620,815, filed Mar. 6, 1966, now abandoned.

Background of the invention

The invention relates to boring bars in which it is desirable to provide abutment means, preferable adjustable to effect accurate location and preferably simultaneous radial adjustment of cutting inserts such for example as polygonal flat-sided indexable inserts.

Summary of the invention

The invention is directed particularly to boring bars and similar cutting implements. In the case of a boring bar the bar is provided with a head, preferably radially enlarged at the cutting end, the head having a plurality of equally circumferentially spaced pockets or recesses each of which opens into the end surface of the head and into the radially outer surface thereof. Each of the pockets is formed to provide a flat blade back-up surface against which indexable inserts are clamped. In addition, each of the recesses is provided with a generally radially extending surface engageable with the axially inner end of an indexable insert received therein. Finally, all of the recesses are open at the radially inner sides thereof to provide for engagement between the radially inner edges of indexable inserts received in the recesses and a conical radial seat provided by an abutment member having a conical head connected to the head of the boring bar coaxially thereof.

Details and features of the invention will become apparent as the description proceeds, especially when taken in conjunction with the accompanying drawings, illustrating preferred embodiments of the invention.

Description of the preferred embodiments

The boring bar comprises an elongated shank 10 having a laterally enlarged head indicated generally at 12 which as illustrated tapers inwardly from the outer end thereof, although the taper on the head is not important.

The head 12 is provided with a plurality of recesses 14 herein illustrated as two in number. It will be appreciated that any convenient number of recesses may be provided dependent on the size of the boring bar. It may be mentioned that it is contemplated that boring bars for bores up to 6 inches in diameter may be provided for cylinder bores.

Figure 1:
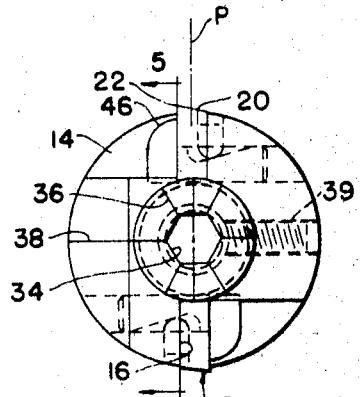
FIGURE 1 is an end view of the boring bar of the present invention.

Each of the recesses is provided with a blade back-up surface 16 against which the back side of a flat cutting blade or insert 18 is seated. As best seen in FIGURE 1, the surfaces 16 are parallel to a diametral plane indicated by the dot and dash line P. In addition, it will be observed that the back-up surfaces 16 are located rearwardly of the diametral plane in the direction of rotation although this is not a requirement. Actually, the front surfaces of the blades 18 might, if desired, be located in the diametral plane.

Figure 2:
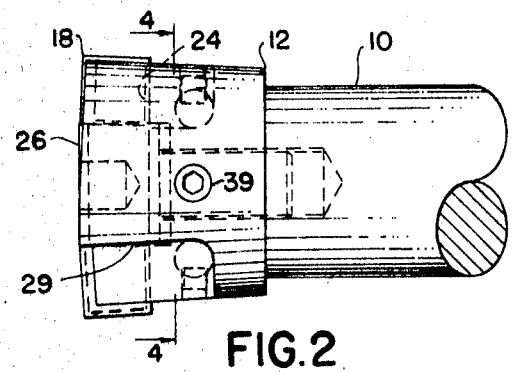
FIGURE 2 is a side elevational view of the boring bar.
Figure 3:
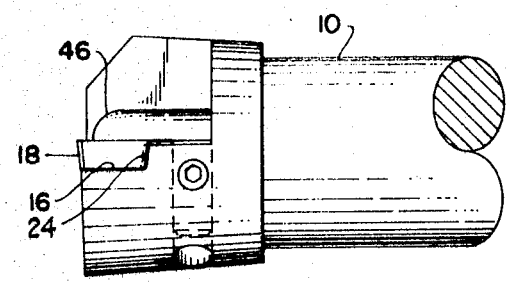
FIGURE 3 is a side elevational view of the boring bar taken 90 degrees from the view of FIGURE 2.

It will further be observed from FIGURES 1, 2 and 3, that the blades 18 are in the form of polygonal indexable inserts. As illustrated herein, the inserts have four sides and hence may be indexed to four different positions. The particular inserts illustrated herein have their edges tapered as indicated at 20 so as to provide cutting edges 22 which have acute included angle cutting edges. However, it is within the purview of the present invention to so incline the back-up surfaces 16 relative to radial planes that strictly symmetrical indexable inserts may be provided having a plurality of cutting edges at each side, all of which have included angles of 90 degrees. With this arrangement and by proper inclination of the back-up surfaces of the recesses, the cutters may be positioned with positive, zero or negative rake as desired. In the illustrated embodiment, due to the positioning of the front surfaces of the cutting blades ahead of radial planes, negative rake is provided.

The recesses which receive the indexable inserts are also provided with axially inner guide surfaces 24. These surfaces are inclined from radial planes at a small angle, which in a practical embodiment of the invention may be at an angle of about 3 degrees.

Figure 5:
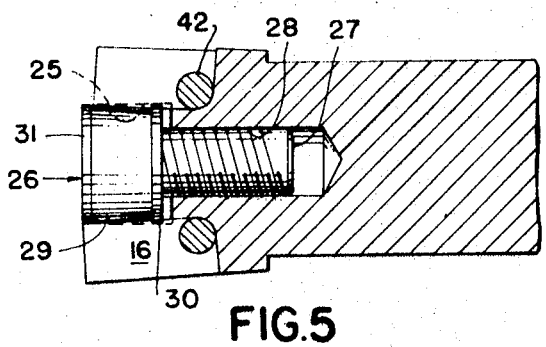
FIGURE 5 is a sectional view on the line 5—5, FIGURE 1.

Each of the recesses opens into a central cylindrical cavity 25, best seen in FIGURE 5, which receives the head of a size-adjusting screw 26. The screw has a threaded shank 27 received in a threaded recess 28 provided at the end of the head 12 in coaxial relation. The head of the screw, as best seen in FIGURE 5, has a conical portion 29, and cylindrical piloting portions 30 and 31 at opposite ends of conical portion 29. Piloting portions 30 and 31 have a close-tolerance fit in piloting relation in the cylindrical cavity 25. Preferably, the size-adjusting screw 26 is provided with a hex recess as indicated at 34 and its peripheral portion is graduated by lines 36 which cooperate with a gauge line 38 to afford an indication of size adjustment. In a practical embodiment of the invention, dependent of course upon the exact taper angle of the head of the size-adjusting screw and the pitch of the threads on the shank 27, rotation of the size-adjusting screw 26 through 60 degrees as indicated by the space between two adjacent graduations, may result in a change of 0.0005 inch in diameter of the bored hole.

It will be noted in FIGURE 2 that the large end of conical portion 29 is the same diameter as cylindrical portions 30, 31, so that the insert 18 may extend beyond conical portion 29 and overlie cylindrical surface 31.

Preferably, lock means are provided for retaining the size-adjusting screw 26 in adjusted position and this means may comprise a friction screw 39 having its head engaged with the threads of the threaded shank 27 of the size-adjusting screw. It will of course be appreciated that to avoid injury to the threads, lock screw 39 may be formed of a softer material.

Means are provided for clamping the indexable inserts 18 in the recesses and this means may take the form of clamps 40 having cylindrical shanks 42 received in cylindrical openings 44 provided in the head. The clamps 40 include clamping heads 46 engageable with the forwardly facing flat sides of the indexable inserts 18, as best illustrated in FIGURES 1 and 3. Preferably, the means for actuating the clamps comprises clamping screws 48 having rounded noses engaging inclined camming surfaces 50 provided in the shanks 42 of the clamps. Thus, as the screws 48 are tightened the clamp-heads 46 are urged in against the front flat sides of the inserts.

From the foregoing description it will be observed that the several indexable inserts are positioned by having three surfaces thereof engaging locating or guiding surfaces. Specifically, the flat back side of the inserts abuts against the flat back-up surfaces 16 of the recesses. The axially inner edges of the inserts engage generally radially extending guide surfaces 24 provided in the inserts which accommodates generally radially inward or outward movemnet of the inserts. The radially inner edges of the inserts engage the locating surface of the conical portion 29 of the size-adjusting screw. Thus, prior to clamping, each of the indexable inserts is accurately located in correct position when its surfaces are brought into engagement with the aforesaid locating surfaces. Thereafter, a clamping force is applied to the front flat surface of each of the inserts by suitable actuation of the clamps 40.

Figure 4:
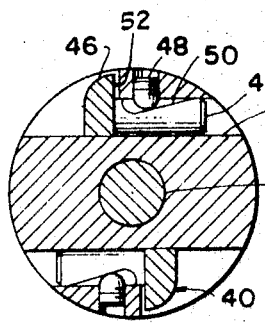
FIGURE 4 is a sectional view on the line 4—4, FIGURE 2.
Figure 8:
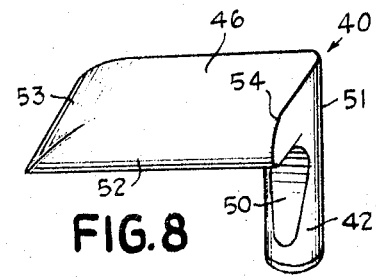
FIGURE 8 is a perspective view of the insert clamp.

In FIGURE 8 the clamp 40 is shown in perspective for greater clarity. As previously described, this clamp includes the cylindrical shank 42 having the camming surface 50 and the generally rectangular clamping head 46. As best seen in this figure the shank 42 extends from one corner of the head 46, this corner of the head being rounded as indicated at 51. The under side of the head 46, from which the shank 42 extends, is a flat clamping surface 52, perhaps best seen in FIGURE 4. The short end surface of the head 46 opposite to the end carrying the shank 42 is rounded as indicated at 53. Similarly, the long edge of the head 46 opposite to the edge from which the shank 42 extends, is rounded as indicated at 54. The sole purpose of the clamp 40 is to lock the associated insert 20 against the surface 16 of the head which locates the cutting insert in one sense. The location of the insert axially of the head is determined by engagement of one edge of the insert with the surface 24 of the head, as best illustrated in FIGURE 3. The location of the cutting insert radially of the head, which determines the hole size produced by the boring bar, is determined by engagement between the radially inner edge of a cutting insert with the longitudinally adjustable conical locating surface 29 of the size adjusting screw 26.

Figure 6:
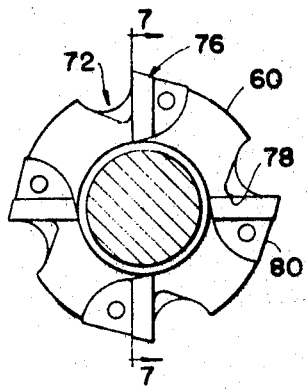
FIGURE 6 is an end view of a second embodiment of the invention.
Figure 7:
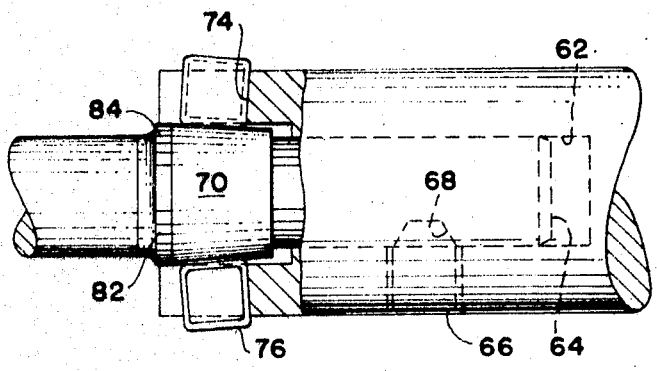
FIGURE 7 is a side elevation, partly in section, on the line 7—7, FIGURE 6.

The embodiment of the invention described in the foregoing has as a special feature thereof axial adjustment of the abutment screw 26. However, the invention is applicable to a construction in which no radial adjustment of the indexable inserts is provided. For a description of this embodiment of the invention, attention is called to FIGURES 6 and 7.

In these figures the boring bar 60 is provided with an axially extending recess 62 adapted to receive a pilot portion 64 longitudinally slidable in the recess 62 and adapted to be positioned therein by a set screw lock 66 having a tapered nose received in a correspondingly tapered recess 68 formed in the boring bar. Alternatively, a set screw may be used against a whistle notch holding the pilot against a shoulder (not shown). The pilot includes an insert locating portion 70 which is of conical configuration and which extends into recesses 72 milled into the end and adjacent side surfaces of the boring bar 60. The milled recesses include axially facing surfaces 74 which abut against the inner edges of the indexable inserts 76. The indexable inserts are further clamped against milled surfaces 78 formed in the boring bar by suitable wedge members 80.

Boring bar 70 includes a cylindrical piloting surface 82 slidable in piloting relation in the central cylindrical cavity 84.

The axially extending recess 62 may be accurately formed in the boring bar 60 and, with cavity 84, provides accurate location for the conical insert locating portion 70 which engages the radially inner edges of the indexable inserts 76, as clearly seen in the figures.

While this embodiment of the invention lacks the fine radial adjustment structure of the previously described embodiment, it does provide a simple means for insuring accurate and symmetrical location of the several indexable inserts at a fixed radial distance from the axis of the boring bar, as determined by the conical portion 70 of the pilot.

The drawings and the foregoing specification constitute a description of the improved boring bar in such full, clear, concise and exact terms as to enable any person skilled in the art to practice the invention, the scope of which is indicated by the appended claims.

What I claim as my invention is:

1. A boring bar having a head provided with a plurality of recesses each opening into the end and side of said head, each of said recesses having a flat blade support surface extending substantially parallel to a diametral plane of said head and engageable with one side of an indexable insert in said recess, an axial positioning surface extending generally radially of said head, engageable with an edge of an indexable insert in said recess, a hole size determining member having a portion tapered longitudinally of said bar and forming the inner sides of all of said recesses to provide in each recess a radial seat for indexable inserts therein, said member being received in a longitudinally extending axially located recess in said head to provide for radial location of all inserts, and clamp members carried by said head and having clamping portions directly engageable with indexable inserts received in said recesses with the said one side thereof in engagement with the said support surfaces, the axially inner edges thereof in locating engagement with said axial positioning surfaces, and the radially inner edges thereof in locating engagement with the tapered portion of said member, said clamping portions being engageable with the side of said inserts opposite to the side in engagement with said support surfaces.

2. A boring bar is defined in claim 1 in which said axially located recess is threaded, said member having a threaded portion received in said recess and providing for axial adjustment of said tapered portion and corresponding simultaneous equal radial adjustment of said inserts.

3. A boring bar as defined in claim 1, said member having a cylindrical piloting surface at one end of said tapered portion, said head having a cylindrical piloting cavity receiving said piloting surface.

4. A boring bar as defined in claim 1, said member having cylindrical piloting surfaces at both ends of said tapered portion, said head having a cylindrical piloting cavity receiving said piloting surface.

5. A boring bar as defined in claim 2 in which said support surfaces are located so as to position the front surfaces of the inserts ahead of the diametral plane in the direction of rotation.

6. A boring bar as defined in claim 2, the axial positioning surfaces being inclined to conform generally to rearwardly inclined edge surfaces of indexable inserts.

7. A boring bar as defined in claim 2, said threaded member having angularly disposed graduations thereon to provide an indication of change in hole size resulting from predetermined rotation thereof.

8. A boring bar as defined in claim 2, said clamp members comprising clamping heads and shafts extending therefrom, the head of said bar having cylindrical openings which guidingly receive said shafts, said shafts having camming surfaces inclined longitudinally thereof, and actuating and locking screws in the head of said bar engaging said camming surfaces.

9. A boring bar as defined in claim 2, said recesses being disposed at predetermined circumferentially spacing around the head of said boring bar.

References Cited

UNITED STATES PATENTS

| | | | |
|---|---|---|---|
| 1,350,394 | 8/1920 | Van der Vorn | 77—58.32 |
| 2,930,111 | 3/1960 | St. Clair | 29—105.1 |
| 3,091,138 | 5/1963 | Berry | 77—58 |
| 3,195,376 | 7/1965 | Bader | 77—58.3 |
| 3,220,089 | 11/1965 | Hammers | 29—96 |
| 3,276,101 | 10/1966 | Plein | 77—58.32 |
| 3,371,394 | 3/1968 | Dupuis | 77—58 |

FOREIGN PATENTS

| | | |
|---|---|---|
| 964,725 | 7/1964 | Great Britain. |

GERALD A. DOST, Primary Examiner

U.S. Cl. X.R.

29—96, 105